(12) United States Patent
Gloeckner et al.

(10) Patent No.: US 11,607,941 B2
(45) Date of Patent: Mar. 21, 2023

(54) PROPULSION DRIVE SYSTEM FOR MOBILE MACHINE

(71) Applicant: ZF Friedrichshafen AG, Friedrichshafen (DE)

(72) Inventors: Rico Gloeckner, Pocking (DE); Migen Bebeti, Passau (DE); Jan Doering, Passau (DE); Juergen Legner, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 372 days.

(21) Appl. No.: 16/844,000

(22) Filed: Apr. 9, 2020

(65) Prior Publication Data

US 2020/0324636 A1    Oct. 15, 2020

(30) Foreign Application Priority Data

Apr. 11, 2019    (DE) ...................... 10 2019 205 231.2

(51) Int. Cl.
  *B60K 1/00*    (2006.01)
  *B60K 17/06*    (2006.01)
  *H02K 7/116*    (2006.01)

(52) U.S. Cl.
  CPC .............. *B60K 1/00* (2013.01); *B60K 17/06* (2013.01); *H02K 7/116* (2013.01)

(58) Field of Classification Search
  CPC .......... B60K 1/00; B60K 17/06; B60K 17/04; H02K 7/116
  See application file for complete search history.

(56) References Cited

U.S. PATENT DOCUMENTS

| | | | | |
|---|---|---|---|---|
| 3,845,368 A * | 10/1974 | Elco | ........................ | B60L 50/52 388/903 |
| 4,461,988 A * | 7/1984 | Plunkett | .................. | H02P 7/298 318/805 |
| 5,532,671 A * | 7/1996 | Bachman | ............ | B60L 15/2045 340/439 |
| 5,549,172 A * | 8/1996 | Mutoh | .................... | B60L 15/20 180/65.6 |
| 6,194,802 B1 * | 2/2001 | Rao | ........................ | H02K 21/24 310/191 |
| 8,944,194 B2 * | 2/2015 | Glaser | ..................... | B60K 6/26 180/65.245 |

(Continued)

FOREIGN PATENT DOCUMENTS

DE    102008041985 A1    3/2010

*Primary Examiner* — Frank B Vanaman
(74) *Attorney, Agent, or Firm* — Leydig, Voit & Mayer, Ltd.

(57) ABSTRACT

A propulsion drive system for a mobile machine includes an electric motor having a first range, in which a torque is constant as a rotational speed rises, and a second range, in which a power is constant as the rotational speed rises. The propulsion drive system further includes a transmission operatively connected mechanically to the electric motor. The propulsion drive system is configured to be transferred, via the transmission, from a state for relatively low driving speeds into a state for relatively high driving speeds of the mobile machine. The electric motor and the transmission are adapted to one another in such a way that the electric motor can be operated in the state for relatively low driving speeds exclusively in the first and second range.

9 Claims, 2 Drawing Sheets

(56) References Cited

U.S. PATENT DOCUMENTS

| | | |
|---|---|---|
| 2008/0220933 A1 | 9/2008 | Maeda |
| 2011/0219772 A1 | 9/2011 | Steuernagel et al. |
| 2016/0031433 A1* | 2/2016 | Park ..................... B60W 30/19 |
| | | 903/945 |
| 2017/0197614 A1* | 7/2017 | Burt ..................... B60W 20/40 |
| 2018/0119784 A1* | 5/2018 | Cui ..................... F16H 57/0441 |

* cited by examiner

PROPULSION DRIVE SYSTEM FOR MOBILE MACHINE

CROSS-REFERENCE TO PRIOR APPLICATIONS

This application claims benefit to German Patent Application No. DE 10 2019 205 231.2, filed on Apr. 11, 2019, the entire disclosure of which is hereby incorporated by reference herein.

FIELD

The present invention relates to a propulsion drive system for a mobile machine, and to a mobile machine with a propulsion drive system. The propulsion drive system comprises an electric motor and a transmission which is operatively connected mechanically to the electric motor.

BACKGROUND

Conventional wheel loaders have a propulsion drive for moving the wheel loader and a working drive for performing a working task by way of the wheel loader. Both the propulsion drive and the working drive are conventionally driven via an internal combustion engine. Here, for example, the internal combustion engine can supply a hydraulic circuit with energy, via which hydraulic circuit in turn the wheels of the wheel loader can be driven. Furthermore, it is known to replace the internal combustion engine with an electric motor for the electrification of the drive train.

SUMMARY

In an embodiment, the present invention provides a propulsion drive system for a mobile machine. The propulsion drive system includes an electric motor having a first range, in which a torque is constant as a rotational speed rises, and a second range, in which a power is constant as the rotational speed rises. The propulsion drive system further includes a transmission operatively connected mechanically to the electric motor. The propulsion drive system is configured to be transferred, via the transmission, from a state for relatively low driving speeds into a state for relatively high driving speeds of the mobile machine. The electric motor and the transmission are adapted to one another in such a way that the electric motor can be operated in the state for relatively low driving speeds exclusively in the first and second range.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
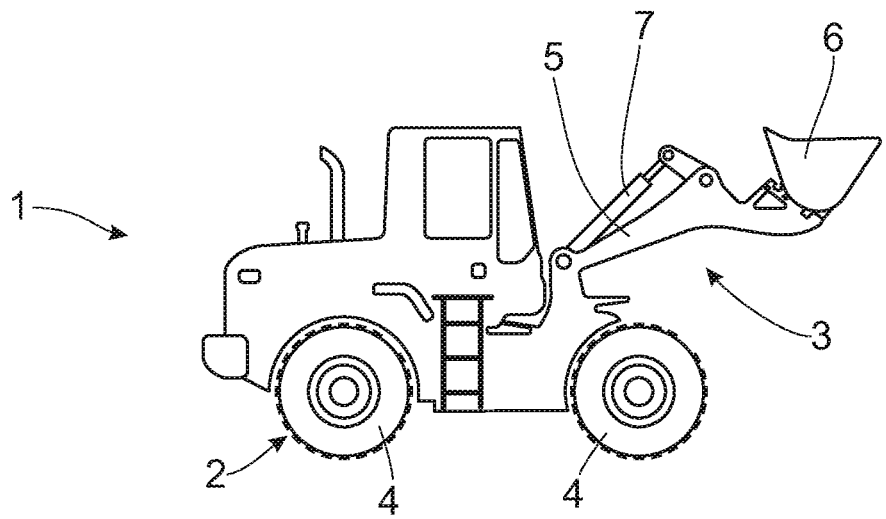
FIG. 1 shows a mobile machine in accordance with an embodiment.

The present disclosure relates to a propulsion drive system for a mobile machine. As described at the outset, the propulsion drive of the mobile machine serves to move the mobile machine, that is to say, to drive it forward and/or in reverse. In addition, the mobile machine can have a working drive for performing a working task, for example for lifting and/or tilting a bucket. The propulsion drive of the mobile machine can comprise wheels and/or tracks which can be driven via the propulsion drive. The mobile machine can in principle be any desired mobile machine, for example a construction or agricultural machine.

The propulsion drive system has an electric motor which can be a synchronous or asynchronous motor. Within the context of one embodiment, the propulsion drive system has exclusively the one electric motor and no further motor. The electric motor comprises a first operating range, in the case of which its torque is constant as the rotational speed rises. In said first operating range, the power of the electric motor can increase as the rotational speed rises. Furthermore, the electric motor comprises a second operating range, in the case of which its power is constant as the rotational speed rises, it being possible for the torque of the electric motor to decrease in said second operating range as the rotational speed rises. It is conceivable that the first operating range reaches from the standstill of the electric motor as far as a first rotational speed, and the second operating range reaches from the first rotational speed as far as a second rotational speed, which can be greater than the first rotational speed. The power and the torque of the electric motor can in each case be variables at the output thereof.

Moreover, the propulsion drive system has a transmission which is operatively connected mechanically to the electric motor. The transmission can be provided in the mechanical power flow between the electric motor and wheels/tracks of the mobile machine. Via the transmission, the propulsion drive system can be transferred from a first state, in which the mobile machine can be moved at relatively low driving speeds, into a second state, in which the mobile machine can be moved at relatively high driving speeds.

Here, the electric motor and the transmission of the propulsion drive system are adapted to one another in such a way that the electric motor can be operated in the entire state for relatively low driving speeds exclusively in the first and second operating range. In other words, in the state for relatively low driving speeds, the electric motor is operated exclusively in a range, in the case of which the torque or the power is constant as the rotational speed rises. In the state for relatively low driving speeds, driving speeds from a standstill as far as a first driving speed at a defined level can be achieved. It is likewise conceivable, however, that a driving speed spectrum can be realized in the state for relatively low driving speeds, which driving speed spectrum reaches from a driving speed which does not equal zero as far as a higher driving speed.

It is possible by way of the propulsion drive system to operate the electric motor in an optimized manner. Thus, in the case of moving off, the electric motor can be operated in the first range, in which high tractive powers which are required for moving off can be provided. Subsequently, when a defined driving speed which can be, for example, approximately 4 to 6 km/h is reached, the electric motor can be operated in the second range, in the case of which a constant power can be provided at the wheel/track. As a result, the tractive power characteristic curve of the propulsion drive system can thus have optimum characteristics.

Furthermore, the electric motor can have a third operating range, in the case of which the power decreases as the rotational speed rises. The torque of the electric motor can also decrease in said third range as the rotational speed rises. The electric motor can be operated in the first range at low rotational speeds, in the second range at medium rotational speeds, and in the third range at high rotational speeds. The propulsion drive system can comprise, furthermore, a control device which is set up to transfer the transmission in the case of acceleration of the mobile machine from the state for relatively low driving speeds into the state for relatively high driving speeds before a transition rotational speed is reached, from which the electric motor is operated in the third range. The device of a control device for carrying out a defined function can be understood to mean the specific preparation, for example programming, of the control device for carrying out the function. Via the control device, the state of the propulsion drive system can accordingly be switched over via the transmission before the electric motor is operated in the third range. Via the switchover of the state of the propulsion drive system, the electric motor can be operated over a greater driving speed range of the mobile machine in the second range, in the case of which the power is constant as the rotational speed rises.

The transmission can have a first gear for the relatively low driving speeds and a second gear for the relatively high driving speeds. The first gear can be engaged in the transmission in the state for relatively low driving speeds, whereas the second gear can be engaged in the state for relatively high driving speeds. The two gears can be step-down gears which in each case step down the rotational speed of the electric motor. The first gear can have a greater transmission ratio in terms of magnitude than the second gear. It is also conceivable in this context, however, that the transmission has merely a single gear which can likewise be configured as a step-down stage. In this case, the first gear can be engaged in the state for relatively low driving speeds, whereas, in the state for relatively high driving speeds, the electric motor can be coupled directly to the output of the propulsion drive system or the wheels/tracks of the mobile machine, without a further step-up/step-down transmission taking place. The transmission can also have more than two, for example three or four, gears.

Within the context of one embodiment, the gear increment between the first and second gear is selected in such a way that the tractive power characteristic curves of the two gears match at least in sections in an overlap region, that is to say are of congruent configuration with respect to one another. The tractive power characteristic curve of a gear can be understood to mean the profile of the tractive power plotted against the driving speed of the mobile machine. An optimized tractive power characteristic curve of the entire propulsion drive system can be provided by way of an overlap of this type of the gears. Furthermore, gear changes can be saved on account of the overlap, since driving speeds in the overlap range can be realized in each case by way of two different gears. Here, within the context of one embodiment, the propulsion drive system is configured in such a way that the transition rotational speed is reached in the overlap range of the tractive power characteristic curves. As a result of this configuration, it is possible to realize a continuous, for example constant and differentiable, transition from the tractive power characteristic curve of the first gear to that of the second gear. As a result, a propulsion drive system is thus provided with an optimized tractive power profile.

Within the context of one embodiment, the electric motor and the transmission are adapted to one another in such a way that the electric motor can be operated in the state for relatively high driving speeds in the second and third range. It is conceivable within the context of one embodiment that the electric motor is operated in the state for relatively high driving speeds exclusively in the second and third range. The control device can also be set up correspondingly, for example can control the electric motor correspondingly. Thus, as a result of the transfer of the propulsion drive system from the state for relatively low driving speeds into the state for relatively high driving speeds, the electric motor is first of all still operated in the second range, in the case of which the power is constant as the rotational speed rises. Within the context of said embodiment, the electric motor can be operated in the third range only at high driving speeds which can lie in the vicinity of the maximum driving speed of the mobile machine. As a result of said embodiment, the driving speed range, in the case of which a constant power is transmitted to the wheels/tracks, can be enlarged. This is made possible by it being possible for the electric motor to be operated in its second operating range over a relatively large driving speed range of the mobile machine as a result of the switchover of the transmission. Thus, costs and drag losses of the propulsion drive system can be reduced, and the efficiency can be increased. Moreover, it is possible as a result of the operation of the electric motor at high driving speeds in the third range to keep the number of gear stages comparatively low. At high driving speeds, the power requirement of the mobile machine can be comparatively low in any case here, since high driving speeds frequently have to be realized merely in an unloaded state and/or on level ground. As a consequence, the operation of the electric motor in the third range at high vehicle speeds frequently does not lead to any significant losses in the power capability of the propulsion drive system.

Within the context of one embodiment, furthermore, the propulsion drive system can be transferred via the transmission into a state for even higher driving speeds. This state for even higher vehicle speeds can be provided, in order to drive the mobile machine at driving speeds which are higher than in the state for relatively high driving speeds. Within the context of said embodiment, furthermore, the electric motor and the transmission can be adapted to one another in such a way that the electric motor can be operated in the entire state for relatively high driving speeds exclusively in the second range. In the state for even higher driving speeds, the electric motor can be operated, for example exclusively, in the second and third range. As a result of the provision of a further state for even higher driving speeds, the range, in which the electric motor can be operated in the second range and constant power can be provided at the wheels/tracks of the mobile machine, can be enlarged toward higher driving speeds. For this purpose, the transmission can have a third gear which can be engaged in the transmission of the propulsion drive system in the state for even higher driving speeds. The third gear can be a step-down stage and, for example, can have a lower transmission ratio in terms of magnitude than the first and second gear.

Within the context of one embodiment, the transmission can be a powershift transmission. In the case of the powershift transmission, the transmission ratio can be changed under load, that is to say while driving, without an interruption of the tractive power. In the powershift transmission, in the case of shifting of a gear, a shifting element of the old gear can be opened and, at the same time, another shifting element of the new gear can be closed. For this purpose, the powershift transmission can have, for example, shifting elements which are configured as friction clutches. As a result of the provision of the powershift transmission, an optimized tractive power characteristic curve without interruption in the case of shifting operations can be provided.

In a further aspect, the present disclosure relates to a mobile machine with a propulsion drive system in accordance with one of the above-described embodiments. The mobile machine can be a mobile machine which, in proper operation, can drive in a loaded state at low driving speeds, and drives in an unloaded state at its maximum driving speed. In the case of mobile machines of this type, in particular, the propulsion drive system leads to optimum operating conditions, since it provides constant power at the wheels/tracks at low driving speeds in the main working range. At high driving speeds, in contrast, the electric motor is operated in its third range, in the case of which power losses occur as the rotational speed rises. These are not substantial, however, since the mobile machine does not require high power anyway at high vehicle speeds on account of the unloaded state. The mobile machine can be a wheel loader, a grader, a dumper truck, a reach stacker, a forklift, a material handling means or a tractor. Other mobile machines are also conceivable here. With respect to the understanding and the advantages of the individual features, reference is made to the above comments.

Figure 2:
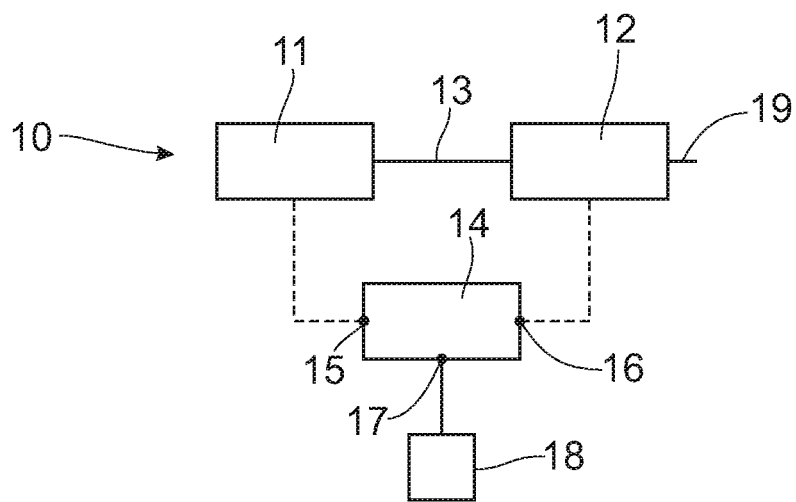
FIG. 2 shows a propulsion drive system of the mobile machine which is shown in FIG. 1.

FIG. 1 shows a wheel loader 1 in accordance with an embodiment. The wheel loader 1 has a propulsion drive 2 for moving the wheel loader 1, and a working drive 3 for performing a working task by way of the wheel loader 1. The propulsion drive 2 comprises a propulsion drive system 10 which is shown in FIG. 2 and is operatively connected mechanically via shafts (not shown) to wheels 4 of the wheel loader 1. The wheel loader 1 can be moved via the propulsion drive system 10 and the wheels 4 which are operatively connected mechanically to it. The working drive 3 of the wheel loader 1 has a main arm 5, at the distal end of which a wheel loader bucket 6 is mounted rotatably. The bucket 6 can be raised, lowered and tilted via a working hydraulic system 7, in order thus, for example, to load bulk material from a heap into a dump truck.

The propulsion drive system 10 (shown in FIG. 2) of the wheel loader 1 has an electric motor 11 which is operatively connected mechanically via a shaft 13 to a transmission 12. The transmission 12 is arranged in the mechanical power flow between the electric motor 11 and the wheels 4 of the wheel loader 1. Accordingly, the power of the electric motor 11 can be transmitted via the transmission 12 to the wheels 4 in order to move the wheel loader 1. For this purpose, the transmission 12 has an output 19, to which the wheels 4 are operatively connected mechanically via shafts (not shown). In the embodiments which are described in the following text, the transmission 12 has two or three gears with in each case different transmission ratios. Furthermore, the propulsion drive system 10 has a control device 14 which is connected electrically via a motor interface 15 and a transmission interface 16 to the electric motor 11 and the transmission 12, respectively. Via the control device 14, the electric motor 11, for example the rotational speed of the electric motor 11, and the transmission 12, for example the gear of the transmission 12, can be controlled in a manner which is dependent on a driving request, for example an accelerator pedal position. The driving request can be provided to the control device 14 via a request interface 17. A request sensor 18, for example an accelerator pedal of the wheel loader 1, can be connected to the request interface 17.

The electric motor 11 of the wheel loader 1 is configured in such a way that it has the power/torque behavior described with reference to FIG. 3 in a manner which is dependent on its rotational speed N. More specifically, the electric motor 11 has a first range I which reaches from a standstill, that is to say the rotational speed N=0, as far as a motor rotational speed $N_1$. In said first range I, the power P rises in a linear manner from P=0 as far as the power $P=P_1$ as the rotational speed N rises. The torque of the electric motor 11 has a constant value $M=M_1$ in said first range I with a rising rotational speed N. Furthermore, the electric motor 11 has a second range II which reaches from the rotational speed $N=N_1$ as far as the rotational speed $N=N_2$, $N_2$ being greater than $N_1$. In said second range II, the power of the electric motor 11 has the constant value $P=P_1$ as the rotational speed N rises. In said second range II, the torque M of the electric motor 11 falls in a hyperbolic manner from the constant value $M=M_1$ to the value $M=M_2$. Moreover, the electric motor 11 has a third range III which reaches from the rotational speed $N=N_2$ as far as a maximum rotational speed of the electric motor 11 $N=N_3$. In said third range III, the power P of the electric motor 11 falls in a linear manner from the constant value $P=P_1$ to a value $P=P_2$. In said third range III, the torque M of the electric motor 11 also falls in a linear manner from the value $M=M_2$ to a lower value $M=M_3$.

In a first embodiment which will be described with reference to FIG. 4, the propulsion drive system 10 which is shown in FIG. 2 has a transmission 12 with two gears. Here, the transmission ratios of the two gears of the transmission 12 are adapted to one another and to the electric motor 11 in such a way that the wheel loader 1 can realize any driving speed in the overall driving speed spectrum of the wheel loader 1, for example from 0 to 40 km/h, by way of the propulsion drive system 10. As can be seen from FIG. 4, the transmission 12 has a first gear with a first tractive power characteristic curve $Z_1$, and a second gear with a second tractive power characteristic curve $Z_2$ as a function of the driving speed v of the wheel loader 1. The first gear is provided for relatively low driving speeds v, and the second gear is provided for relatively high driving speeds v. The two gears of the transmission 12 are adapted to one another in such a way that their tractive power characteristic curves $Z_1$ and $Z_2$ are congruent with respect to one another in a transition region $b_1$. The two gears are step-down stages, the first gear having a higher step-down ratio than the second gear.

Figure 4:
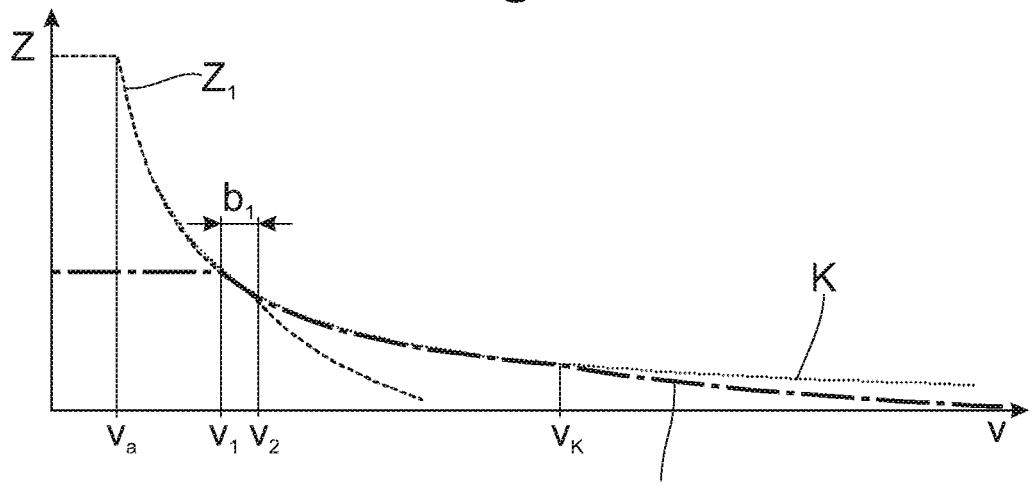
FIG. 4 shows a tractive power profile of the propulsion drive system from FIG. 2 in accordance with an embodiment.

Moreover, FIG. 4 illustrates a hyperbola K of constant power. As can be seen from FIG. 4, the propulsion drive system 10 of the first embodiment is designed in such a way that the tractive power characteristic curve $Z_1$ of the first gear runs along the hyperbola K at relatively low driving speeds v. At the end of the transition region $b_1$ at a change speed $v_2$, however, the characteristic curve $Z_1$ falls below the hyperbola of constant power K. In contrast, the tractive power characteristic curve $Z_2$ of the second gear runs from a change speed $v_1$ which is present at the beginning of the transition region $b_1$, as far as a relatively high driving speed $v_k$ which is higher than the change speed $v_2$, along the hyperbola of constant power K. For a driving speed v which is higher than the driving speed $v_k$, the tractive power characteristic curve $Z_2$ falls below the hyperbola of constant power K, however. A configuration of this type of the tractive power characteristic curves $Z_1$ and $Z_2$ is realized by way of a corresponding adaptation of the gear increment, that is to say the ratio of the transmission ratios between the first and second gear.

The control device 14 is set up to move off the wheel loader 1 in the first gear along the tractive power characteristic curve $Z_1$ when a corresponding signal is received by way of the request sensor 18 via the request interface 17. Thus, a high constant tractive power can first of all be provided, for example 80%-110% of the unladen weight of the mobile machine, in the case of moving off up to a driving speed $v_a$ which is, for example, 4-6 km/h. The control device 14 of the propulsion drive system 10 is furthermore set up to operate the wheel loader 1 in the case of further acceleration in the first gear along the tractive power characteristic curve $Z_1$, and to switch over the transmission 12 via the transmission interface 16 from the first into the second gear when the change speed $v_2$ is reached. The wheel loader 1 can thus be operated by way of the propulsion drive system 10, after moving off, in the main working range between the driving speeds $v_a$ and $v_k$ along the hyperbola of constant power K. If the wheel loader 1 is to be accelerated to a speed which is higher than $v_k$, the wheel loader is accelerated further along the tractive power characteristic curve $Z_2$ as far as the maximum driving speed, said tractive power characteristic curve $Z_2$ running below the hyperbola of constant power K at high driving speeds.

Furthermore, the control device 14 is set up to operate the wheel loader 1 in the case of braking of the mobile machine 1 in the same gears and along the same tractive power characteristic curves $Z_1$, $Z_2$ as in the case of accelerating. The control device 14 is set up, however, to shift from the second gear back into the first gear when the change speed $v_1$ is reached. As a result of the provision of the transition range $b_1$ and the switchover of the gear at the respective end of the transition range in the case of accelerating and braking, the number of gear changes can be reduced, which minimizes the transmission wear, for example.

Figure 3:
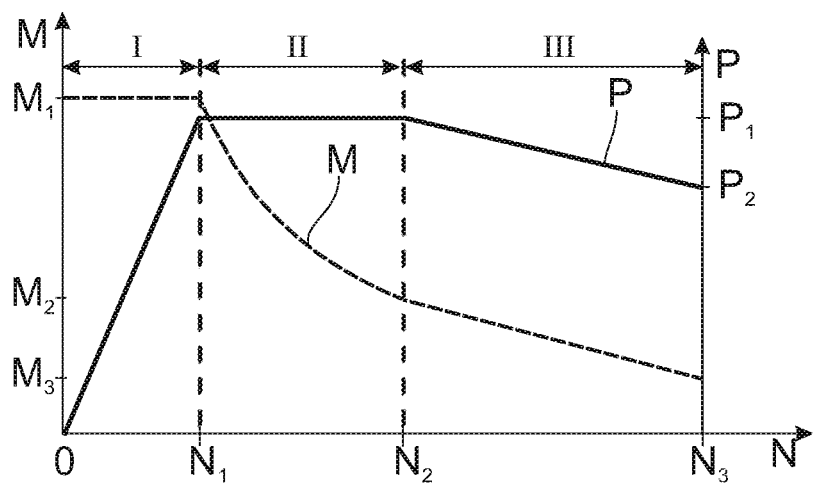
FIG. 3 shows a power and torque characteristic curve as a function of the rotational speed of the electric motor of the propulsion drive system shown in FIG. 2.

Here, the propulsion drive system 10 of the first embodiment is configured in such a way that the electric motor 11 is operated in the first gear of the transmission 12 exclusively in the first and second range I, II in FIG. 3, in the case of which the torque M and/or the power P are/is constant as the rotational speed N rises. Furthermore, the propulsion drive system 10 is configured in such a way that the electric motor 12 is operated in the second gear merely in the second and third range II, III in FIG. 3.

Figure 5:
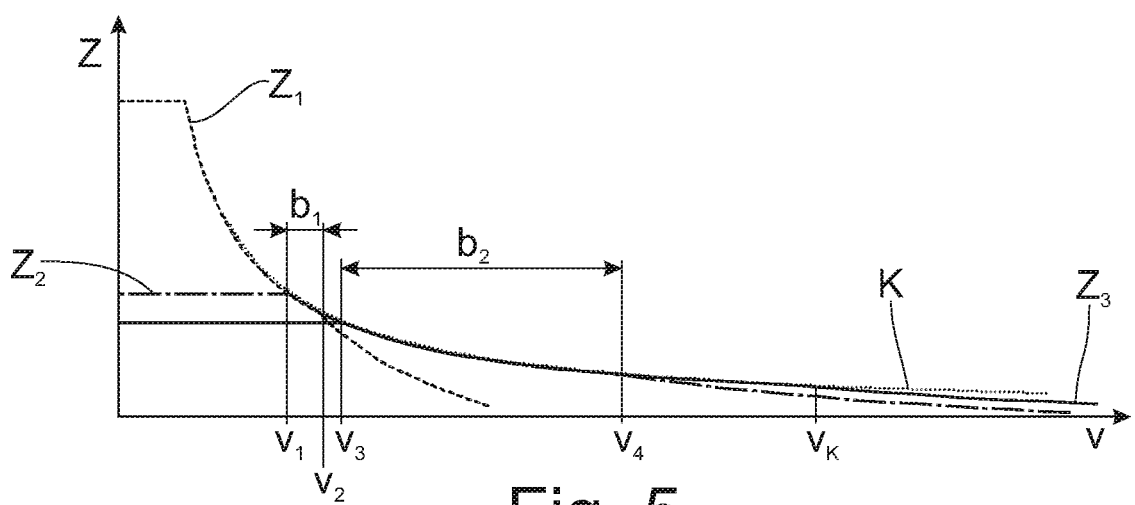
FIG. 5 shows a tractive power profile of the propulsion drive system from FIG. 2 in accordance with an embodiment.

FIG. 5 shows a tractive power profile of the propulsion drive system from FIG. 2 in accordance with a second embodiment. The embodiment which is described with reference to FIG. 5 corresponds to the embodiment which is described with reference to FIG. 4, with the exception of the differences described in the following text. In contrast to the first embodiment, the transmission 12 of the second embodiment has three gears. The transmission ratios of the first and second gear are adapted to one another in such a way that their tractive power characteristic curves $Z_1$ and $Z_2$ overlap in a transition region $b_1$ which reaches from a driving speed $v_1$ as far as a higher driving speed $v_2$. Furthermore, the transmission ratios of the second and third gear are adapted to one another in such a way that their tractive power characteristic curves $Z_2$ and $Z_3$ overlap in a transition region $b_2$ which reaches from a driving speed $v_3$ which is greater than $v_2$ as far as an even greater driving speed $v_4$. The control device 14 of said second embodiment is set up to shift the transmission 12, during acceleration of the wheel loader 1, from the first into the second gear when the change speed $v_2$ is reached, and to shift the transmission 12 from the second into the third gear when the change speed $v_4$ is reached. Furthermore, the control device 14 is set up to shift the transmission 12, during retardation of the wheel loader 1, from the third into the second gear when the change speed $v_3$ is reached, and to shift the transmission 12 from the second into the first gear when the change speed $v_1$ is reached.

In said second embodiment, the propulsion drive system 10 is configured in such a way that the electric motor 11 is operated in the first gear exclusively in the ranges I and II, in the second gear exclusively in the range II, and in the third gear exclusively in the ranges II and III in FIG. 3. In the second embodiment, the driving speed $v_k$, up to which the wheel loader 1 can be operated along the hyperbola of constant power K, can be increased in comparison with the first embodiment. For example, the driving speed $v_k$ can lie at 30 km/h.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS

1 Wheel loader, mobile machine
2 Propulsion drive
3 Working drive
4 Wheels
5 Main arm
6 Bucket
7 Working hydraulic system
10 Propulsion drive system
11 Electric motor
12 Transmission
13 Shaft
14 Control device 15 Motor interface
16 Transmission interface
17 Request interface
18 Request sensor
19 Output
M, $M_1$, $M_2$, $M_3$ Torque
P, $P_1$, $P_2$ Power
N, $N_1$, $N_2$, $N_3$ Rotational speed
Z, $Z_1$, $Z_2$, $Z_3$ Tractive power
v, $v_1$, $v_2$, $v_3$, $v_4$, $v_k$, $v_a$ Driving speed
$b_1$, $b_2$ Transition range
I, II, III Operating range of electric motor
K Hyperbola of constant power

What is claimed is:

1. A propulsion drive system for a mobile machine, the propulsion drive system comprising:
   an electric motor having a first range, in which a torque is constant as a rotational speed rises, a second range, in which a power is constant as the rotational speed rises, and a third range, in which the power decreases as the rotational speed rises; and
   a transmission operatively connected mechanically to the electric motor,
   wherein the propulsion drive system is configured to be transferred, via the transmission, from a state for low driving speeds into a state for high driving speeds of the mobile machine,
   wherein the electric motor and the transmission are adapted to one another in such a way that the electric motor can be operated in the state for low driving speeds exclusively in the first and second range, and
   wherein the propulsion drive system further comprises a control device configured to transfer the transmission in case of acceleration of the mobile machine from the state for low vehicle speeds into the state for high vehicle speeds before a transition rotational speed is reached, from which the electric motor is operated in the third range.

2. The propulsion drive system as claimed in claim 1, wherein the transmission has a first gear for the low driving speeds and a second gear for the high driving speeds.

3. The propulsion drive system as claimed in claim 2, wherein a gear increment between the first gear and the second gear is selected such that tractive power characteristic curves of the first gear and of the second gear are of congruent configuration in sections in a transition range of driving speeds.

4. The propulsion drive system as claimed in claim 1, wherein the propulsion drive system is configured in such a way that the transition rotational speed is reached in a transition range of driving speeds.

5. The propulsion drive system as claimed in claim 1, wherein the electric motor and the transmission are adapted to one another in such a way that the electric motor can be operated in the state for high driving speeds in the second and third range.

6. The propulsion drive system as claimed in claim 1, wherein the propulsion drive system is configured to be transferred, via the transmission, into a state for even higher driving speeds, wherein the electric motor and the transmission are further adapted to one another in such a way that the electric motor can be operated in the state for high driving speeds exclusively in the second range.

7. The propulsion drive system as claimed in claim 1, wherein the transmission is a powershift transmission.

8. A mobile machine with a propulsion drive system as claimed in claim 1.

9. The mobile machine as claimed in claim 8, wherein, during operation, the mobile machine is configured to drive in a loaded state at low driving speeds, and is configured to drive in an unloaded state at a maximum driving speed.

\* \* \* \* \*